United States Patent [19]

Mills

[11] 3,875,788

[45] Apr. 8, 1975

[54] METHOD OF AND APPARATUS FOR DETERMINING THE CONCENTRATION OF A SOLUTION

[75] Inventor: Stephen William Mills, Edenvale, South Africa

[73] Assignee: AE&CI Limited, Johannesburg, South Africa

[22] Filed: Feb. 13, 1973

[21] Appl. No.: 332,116

[30] Foreign Application Priority Data
Mar. 6, 1972  South Africa...................... 72/1510

[52] U.S. Cl. ................ 73/17 R; 23/253 R; 73/15 B
[51] Int. Cl. .......................................... G01n 25/12
[58] Field of Search ............. 23/253 R, 259, 230 R; 73/15 B, 17 R, 190

[56] References Cited
UNITED STATES PATENTS

| 2,800,793 | 7/1957 | Oliver.................................. 73/15 B |
| 3,022,664 | 2/1962 | Stalwijk............................... 73/15 B |
| 3,417,604 | 12/1968 | Bean ................................... 73/15 B |
| 3,436,190 | 4/1969 | Priestley............................ 73/190 R |
| 3,505,024 | 4/1970 | Ishimaru ........................... 73/190 R |
| 3,554,002 | 1/1971 | Harden............................... 73/15 B |

FOREIGN PATENTS OR APPLICATIONS
1,176,907  1/1970  United Kingdom.................. 73/17R Primary Examiner—Morris O. Wolk
Assistant Examiner—Sidney Marantz
Attorney, Agent, or Firm—Cushman, Darby & Cushman

[57] ABSTRACT

A method of determining the fudge point of a solution of a compound the solubility of which changes with temperature, which comprises heating to a temperature above the fudge point of the solution a sample cell and an associated reference cell containing a non-crystallizable liquid, such as a silicone oil introducing a sample of the solution into the sample cell, cooling the cells, simultaneously measuring the temperatures of the sample and the liquid while cooling, recording the temperature of the sample at which the temperature curve of the sample diverges from the temperature curve of the liquid, displacing the sample in the sample cell with a fresh sample and reheating the cells. Apparatus for conducting said method is also disclosed.

1 Claim, 1 Drawing Figure

PATENTED APR 8 1975                                      3,875,788
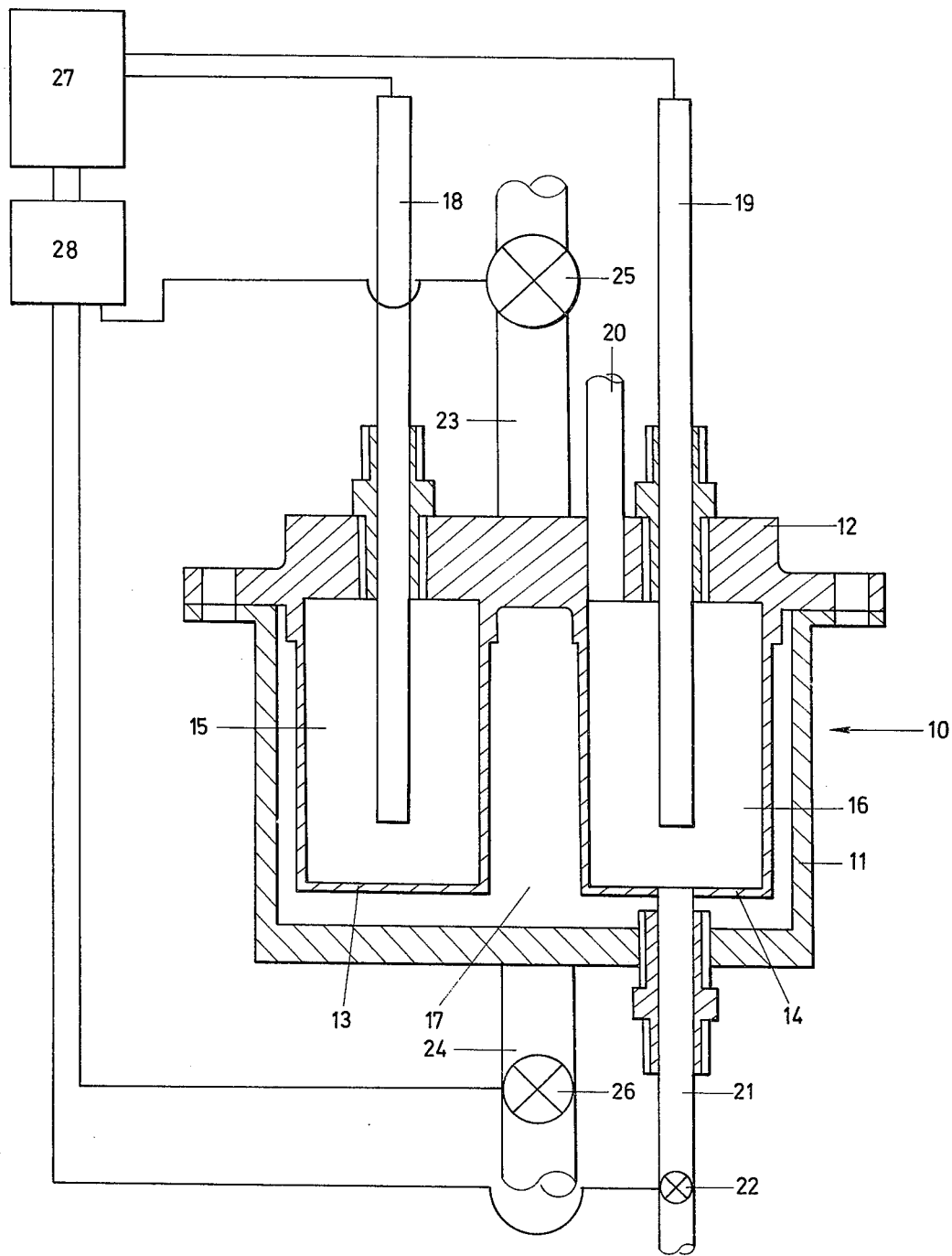

METHOD OF AND APPARATUS FOR DETERMINING THE CONCENTRATION OF A SOLUTION

This invention relates to a method of and apparatus for continually determining the fudge point of a solution of a compound the solubility of which changes with temperature.

The fudge point of such a solution is the temperature at which crystals of the compound begin to form when the solution is cooled.

The fudge point is proportional to the concentration of the solution. Fudge point determinations are used to check the concentrations of, for instance, concentrated ammonium nitrate solutions for the production of prilled ammonium nitrate. These determinations are generally carried out by allowing a sample of the process stream to cool while stirring and determining visually at which temperature crystals are beginning to form. This procedure is time consuming, subject to human errors in judgment and does not provide continuous process control.

Another method for determining fudge points uses an analyser in which a sample stream of the solution under investigation is passed through a sample cell through which a beam of light is transmitted. The intensity of the beam of light is measured and the temperature of the sample stream through the cell is adjusted in response to this measurement, so that the amount of light transmitted through the cell remains constant.

The temperature of the sample stream through the cell is then representative of the concentration of the solution under investigation. A disadvantage of this method is that there is a tendency for crystals of the material under investigation to form on the windows of the sample cell through which the light is transmitted. This affects the amount of light transmitted through the cell which, in turn, will result in unrealistic temperature readings of the sample stream through the cell.

It is an object of the present invention to provide a method of accurately and continually determining the fudge point of a solution of a compound the solubility of which changes with temperature.

It is a further object of the invention to provide apparatus for accurately and continually determining the fudge point of a solution of a compound the solubility of which changes with temperature.

According to the present invention a method is provided of determining the fudge point of a solution of a compound the solubility of which changes with temperature which method comprises heating to a temperature above the fudge point of the solution a sample cell and an associated reference cell containing a non-crystallizable liquid, introducing a sample of the solution into the sample cell, cooling the cells, simultaneously measuring the temperatures of the sample and the liquid while cooling, recording the temperature of the sample at which the temperature curve of the sample diverges from the temperature curve of the liquid, displacing the sample in the sample cell with a fresh sample and reheating the cells.

Further according to the invention apparatus is provided for determining the fudge point of a solution of a compound the solubility of which changes with temperature comprising two associated cells of which one cell is a sample cell provided with inlet means and outlet means for a sample of the solution and the other cell is a reference cell adapted to be filled with a non-crystallizable liquid, means for heating and cooling the cells at the same rate, means for measuring simultaneously the temperatures of the liquid in the reference cell and the sample in the sample cell, means for recording the temperature of the sample at which the temperature curve of the sample diverges from the temperature curve of the liquid, operating means responsive to the recorded temperature to control actuable means to displace the sample contained in the sample cell with a fresh sample and to heat the cells.

The apparatus comprising the two cells is preferably made of metal to facilitate heat conductivity.

The non-crystallizable liquid in the reference cell is preferably a liquid having the same heat capacity as the samples of the solution under investigation. Suitable liquids are, for example, silicone oils which are liquids in the temperature ranges required for the solutions under investigation.

The means for measuring the temperatures of the liquid in the reference cell and the sample in the sample cell are preferably resistance thermometers. The thermometers are preferably connected to a temperature recorder associated with an electronic circuit for actuating valves in the outlet means or in both the inlet and outlet means of the sample cell and for actuating the heating and cooling means of the cells.

The invention will now be described with reference to the drawing without restricting the scope of the invention to the embodiment shown therein.

The drawing is a diagrammatic view of an embodiment of the invention.

In the drawing, device 10 consists of body 11 and lid 12 which is removably attached to body 11. The interiors of cups 13 and 14 define reference cell 15 and sample cell 16. Space 17, which is defined by the inner surfaces of body 11, lid 12 and cups 13 and 14, serves for the circulation of a heating and a cooling medium through device 10.

Thermometer wells 18 and 19 are adapted to receive and accommodate resistance thermometers. Wells 18 and 19 reach into cells 15 and 16 through lid 12 and are removably attached to lid 12.

Inlet means 20 to sample cell 16 passes through lid 12 and is connected to the process stream from which the sample has to be taken. Outlet means 21 from sample cell 16 passes through body 11 and is provided with actuable valve 22 to control the discharge of the sample from cell 16.

Device 10 is further provided with inlet means 23 and outlet means 24 for the heating or cooling medium as required to be passed through space 17. The flow of heating or cooling medium is controlled by actuable valves 25 and 26.

The resistance thermometers which are inserted in wells 18 and 19 are connected to temperature recorder 27, which is connected to electronic switching circuit 28.

Circuit 28 controls actuable valves 22, 25 and 26.

In use, reference cell 15 is filled with a non-crystallizable liquid. Device 10 is heated by passing a heating medium, such as superheated steam, through space 17 by opening valves 25 and 26 on an impulse received from circuit 28.

When the temperature of the liquid in reference cell 15 is above the fudge point of a solution to be investigated, valve 22 is opened on an impulse received from circuit 28. This allows the solution to flow through sample cell 16. Valve 22 closes after a predetermined period of time and sample cell 16 is then filled with a sample of the solution.

Valves 25 and 26 are actuated to allow a cooling medium to flow through space 17. The temperatures in cells 15 and 16 are measured by the resistance thermometers in wells 18 and 19. As soon as the temperature curve of the sample in cell 16 begins to diverge from the temperature curve of the reference liquid in cell 15 due to the latent heat of crystallization of the sample, a signal is passed to switching circuit 28 and the temperature of sample cell 16 is recorded by recorder 27. After a predetermined period of time, say about 10 seconds, actuable valves 22, 25 and 26 are actuated by circuit 28 to allow a fresh sample of the solution to displace the sample in cell 16 and to flow through sample cell 16, and to heat device 10 by allowing the heating medium to flow. Then the cycle of cooling the cells, recording the temperatures and actuating the valves as described above is repeated.

The temperature at which the temperature of the sample diverges from the temperature of the reference liquid is the fudge point and from this temperature the concentration of the solution can easily be determined by using temperature-concentration graphs or directly by calibrating the recorder.

I claim:

1. A method of determining the fudge point of a solution of a compound the solubility of which changes with temperature, which method comprises heating to a temperature above the fudge point of said solution containing said compound a sample cell and an associated reference cell containing a silicone oil, introducing a sample of the solution into the sample cell, cooling the cells, simultaneously measuring the temperatures of the sample and the silicone oil while cooling, and recording the temperature of the sample at which the temperature curve of the sample diverges from the temperature curve of the silicone oil.

* * * * *